(12) United States Patent
Damizet

(10) Patent No.: US 9,631,649 B2
(45) Date of Patent: Apr. 25, 2017

(54) DEVICE FOR ADJUSTING A RATE OF FLOW OF AIR FLOWING ALONG AN AIR DUCT

(71) Applicant: ALDES AERAULIQUE, Venissieux (FR)

(72) Inventor: Patrick Damizet, La Chapelle Villars (FR)

(73) Assignee: ALDES AERAULIQUE, Venissieux (FR)

( * ) Notice: Subject to any disclaimer, the term of this patent is extended or adjusted under 35 U.S.C. 154(b) by 197 days.

(21) Appl. No.: 14/359,800

(22) PCT Filed: Nov. 14, 2012

(86) PCT No.: PCT/FR2012/052625
§ 371 (c)(1),
(2) Date: May 21, 2014

(87) PCT Pub. No.: WO2013/076404
PCT Pub. Date: May 30, 2013

(65) Prior Publication Data
US 2014/0305528 A1    Oct. 16, 2014

(30) Foreign Application Priority Data
Nov. 23, 2011  (FR) ..................... 11 60687

(51) Int. Cl.
| | | |
|---|---|---|
| F15D 1/02 | (2006.01) | |
| F24F 13/14 | (2006.01) | |
| G05D 7/03 | (2006.01) | |

(52) U.S. Cl.
CPC .............. *F15D 1/025* (2013.01); *F24F 13/14* (2013.01); *G05D 7/03* (2013.01); *F24F 2013/1473* (2013.01)

(58) Field of Classification Search
USPC .............................................. 138/43, 45, 46
See application file for complete search history.

(56) References Cited

U.S. PATENT DOCUMENTS 2,895,610 A * 7/1959 Copping .................. B07C 1/14
209/284
2,934,892 A * 5/1960 Hurlbert .................. F02K 1/10
138/45

(Continued)

FOREIGN PATENT DOCUMENTS

| FR | 2168603 A | 8/1973 |
| FR | 2595453 A1 | 9/1987 |
| GB | 1154235 A | 6/1969 |

OTHER PUBLICATIONS

International Search Report issued Apr. 25, 2013 re: PCT/FR2012/052625; citing: U.S. Pat. No. 6,231,438 B1, FR 2 168 603 A1, U.S. Pat. No. 4,018,159 A, FR 2 595 453 A1 and GB 1 154 235 A.

*Primary Examiner* — James Hook
(74) *Attorney, Agent, or Firm* — Cantor Colburn LLP

(57) ABSTRACT

The invention relates to a device (20) for adjusting a rate of flow of air flowing along an air duct, comprising: a tubular body (22) extending along an axis (24); at least one flap (28) able to pivot about an axis transverse to the axis (24) of the body (22); a ring (34) mounted to pivot on an end portion (22*b*) of the body (22) about the axis (24) of this body; each flap (28) being provided with a male drive means and the ring (34) being provided with a female drive means, or vice versa, the male drive means and the female drive means being arranged in such a way that, in response to the ring (34) being pivoted about the body (22), the male drive means engages with the female drive means to alter the position of each flap (28) and hence the cross section available for the passage of air.

11 Claims, 8 Drawing Sheets

(56) References Cited

U.S. PATENT DOCUMENTS

| | | | | |
|---|---|---|---|---|
| 3,997,132 A | * | 12/1976 | Erwin | B64C 23/065 |
| | | | | 244/199.3 |
| 4,018,159 A | | 4/1977 | Bennett | |
| 4,094,492 A | * | 6/1978 | Beeman | F16K 3/03 |
| | | | | 138/45 |
| 4,336,904 A | * | 6/1982 | Jardinier | F16L 55/04 |
| | | | | 137/468 |
| 4,633,900 A | * | 1/1987 | Suzuki | F24F 11/047 |
| | | | | 137/498 |
| 6,231,438 B1 | | 5/2001 | Laudermilk | |
| 8,220,496 B2 | * | 7/2012 | Marica | F04D 29/466 |
| | | | | 138/37 |
| 8,925,578 B2 | * | 1/2015 | Lee | F16K 3/03 |
| | | | | 137/527 |
| 2008/0210325 A1 | * | 9/2008 | Aroussi | B01F 5/061 |
| | | | | 138/39 |
| 2009/0188273 A1 | * | 7/2009 | Dirnberger | F16K 31/521 |
| | | | | 62/404 |
| 2014/0230942 A1 | * | 8/2014 | Takai | B60H 1/345 |
| | | | | 138/45 |

* cited by examiner

DEVICE FOR ADJUSTING A RATE OF FLOW OF AIR FLOWING ALONG AN AIR DUCT

TECHNICAL FIELD

The present invention relates to a device for adjusting a flow rate of air flowing in an air duct. This device is in particular applicable for equipping a controlled mechanical ventilation (CMV) or room air conditioning installation.

BACKGROUND

A device 1 for adjusting a flow rate of air flowing in an air duct, known from the state of the art, is shown in FIG. 1.

This device 1 comprises a tubular body 2 designed to be entirely engaged inside the air duct.

The device 1 comprises a seal 4 mounted on the body 2 to ensure sealing between the body 2 and the air duct.

The device 1 comprises flaps 6 intended to occupy a plurality of positions inside the body 2 corresponding to a plurality of air passage cross sections. To this end, the body 2 comprises grooves 8 and the flaps 6 comprise ribs of complementary shapes arranged to slide in said grooves 8.

The device 1 finally comprises a flexible chamber 10 adapted to inflate or deflate according to the pressure difference between upstream and downstream end portions of the body 2.

When an installer wishes to adjust the flow rate of air flowing in the air duct, he extricates the flaps 6 out of the body 2 by axially sliding the ribs in the grooves 8, moves the flaps 6 radially, and then re-engages the flaps 6 inside the body 2 by axially sliding the ribs in the grooves 8.

The setting of the flow rate of air flowing in the air duct is thus arduous to implement.

BRIEF SUMMARY

The invention aims to overcome this disadvantage.

The invention relates to a device for adjusting a flow rate of air flowing in an air duct, characterized in that it comprises:
- a tubular body extending along an axis, intended to be fluidly connected to the air duct;
- at least one flap extending inside the body and adapted to pivot about an axis transverse to the axis of the body, in order to occupy a plurality of positions corresponding to a plurality of air passage cross sections;
- a ring pivotally mounted on an end portion of the body about the axis of this body;

each flap being provided with a male drive means, and the ring being provided with a female drive means, or vice versa, the male drive means and the female drive means being arranged in such a way that, in response to pivoting of the ring on the body, the male drive means cooperates with the female drive means to alter the position of each flap, and consequently the air passage cross section.

For example, each flap is provided with the male drive means, and the ring is provided with the female drive means.

In this description, the term "axis transverse to the body axis" means an axis belonging to a plane transverse to the axis of the body.

When an installer wishes to preset or adjust the flow rate of air flowing in an air duct equipped with the device according to the invention, the installer simply drives the ring in rotation relative to the body. In response, the male and female drive means cooperate and move each flap inside the body so as to reduce or increase the air passage cross section.

The setting of the flow rate of air flowing in the air duct is thus simplified.

According to one feature, the pivot axis of each flap extends at an upstream end portion of the body, in the air flow direction, and the male and female drive means are disposed at a downstream end portion.

Preferably, the male drive means comprises a finger, the female drive means comprises a tab extending in a plane transverse to the axis of the body and through which a C-shaped slot adapted to receive the finger is provided.

Such an arrangement makes it possible to convert the pivoting of the ring relative to the body about the axis of this body into a pivoting of the flap inside the body about its pivot axis.

Advantageously, the opening has two end portions shaped to receive and immobilize the finger.

Such an arrangement makes it possible to position the flap and ensure holding it in its position, in two predetermined positions relative to the body.

In its preferred embodiment, each flap is molded to the body, and each flap has a thinning of material defining the pivot axis of this flap.

Under these conditions, the manufacture of each flap and the body is jointly achieved by molding. The number of elements constituting the device is limited and the method for assembling the device is facilitated.

According to one feature, the body is provided with a male snap-fastening member and the ring is provided with a female snap-fastening member, or conversely, the male and female snap-fastening members being designed to prevent the axial translation of the ring on the body, and allow the ring to pivot on the body.

The use of such male and female snap-fastening members allows facilitating the mounting, and alternately dismounting, of the ring and the body.

Advantageously, the ring has a splined outer side.

Under these conditions, the gripping and the driving of the ring into rotation are facilitated.

Preferably, the ring has an outer diameter substantially equal to the outer diameter of the body, and preferably an inner diameter substantially equal to the inner diameter of the body.

The device may then be entirely engaged inside an air duct, the inner diameter of which is substantially equal to the outer diameter of the body and the ring.

Finally, in its preferred embodiment, the device comprises a flexible chamber arranged to inflate, or deflate, according to the pressure difference between the upstream and downstream end portions of the body.

Such flexible chamber makes it possible to regulate the flow rate of air flowing in the air duct around a set point, regardless of the airflow disturbances to which the duct is subjected.

BRIEF DESCRIPTION OF THE DRAWINGS

The invention will be better understood in light of the following description with reference to the attached schematic drawing representing, by way of example, a device for adjusting a flow rate of air flowing in an air duct according to the invention.

DETAILED DESCRIPTION

Figure 1:
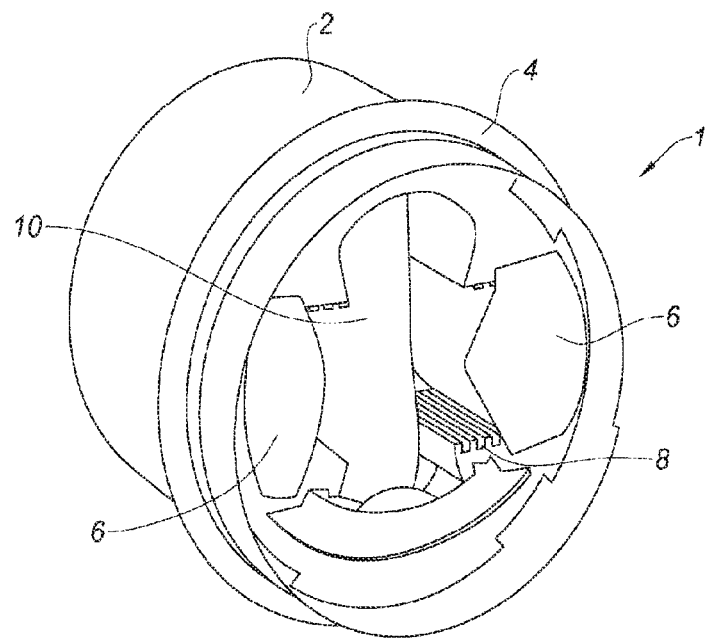
FIG. 1 is a perspective three-quarter front view of a device known from the state of the art.
Figure 2:
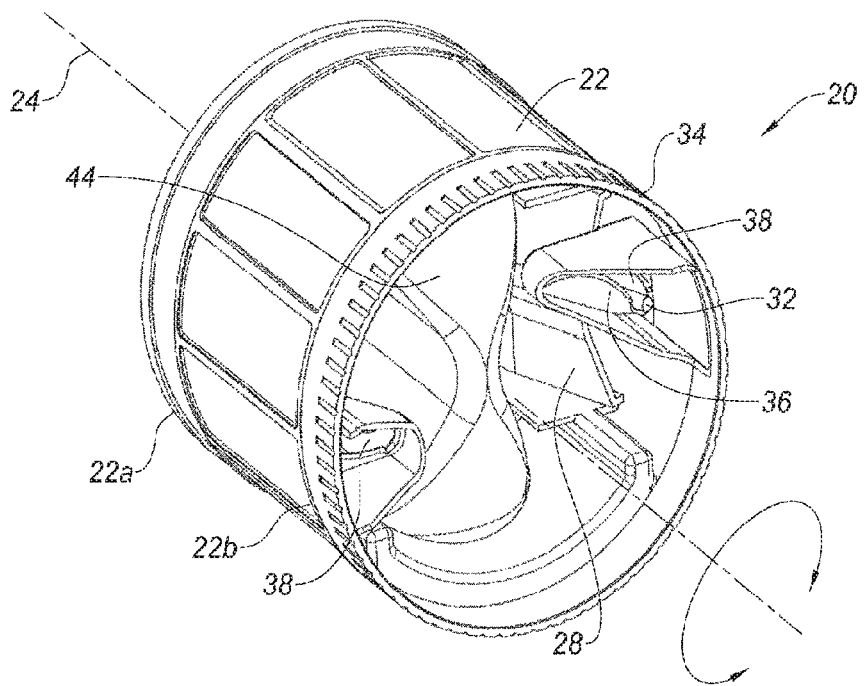
FIG. 2 is a perspective three-quarter front view of the device according to the invention.
Figure 3:
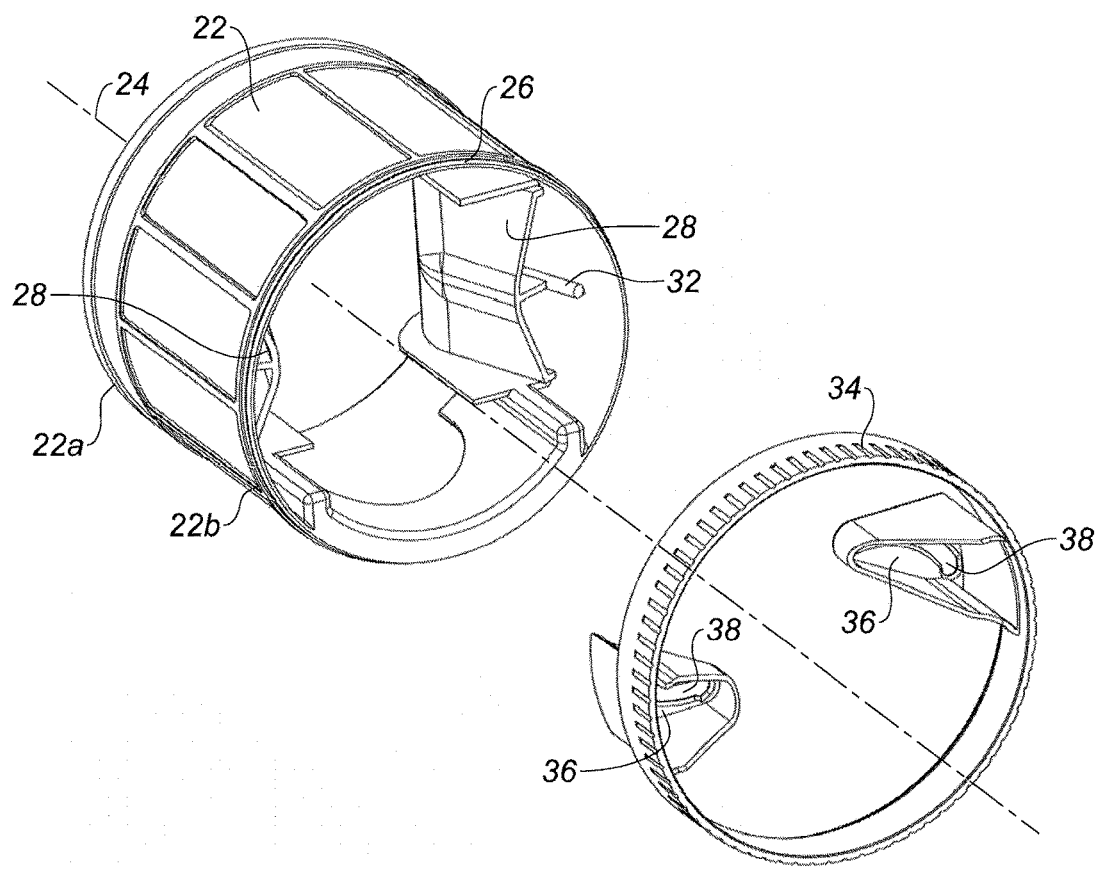
FIG. 3 is an exploded partial perspective view of the device in FIG. 2.

FIGS. 2 to 10 show a device 20 for adjusting a flow rate of air flowing in an air duct (not shown).

The device 20 comprises a tubular body 22 extending along an axis 24. The body 22 is intended to be fluidly connected to said air duct. To this end, the body 22 is, for example, partly or entirely engaged inside the air duct.

The body 22 has an upstream end portion 22a and a downstream end portion 22b.

The body 22 is provided with a male snap-fastening member 26 (shown in FIGS. 3 and 9) arranged on the downstream end portion 22b. The male snap-fastening member 26 takes herein the form of an annular protrusion.

Figure 4:
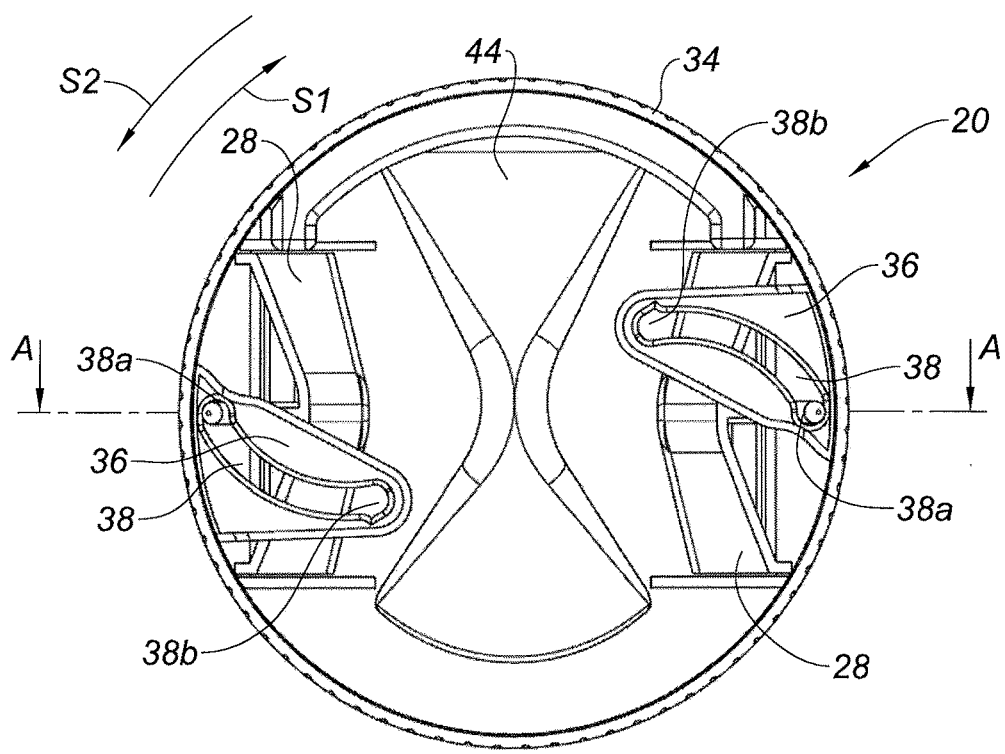
FIG. 4 is a top view of the device in FIG. 2 in which flaps are in a spaced-apart position.
Figure 5:
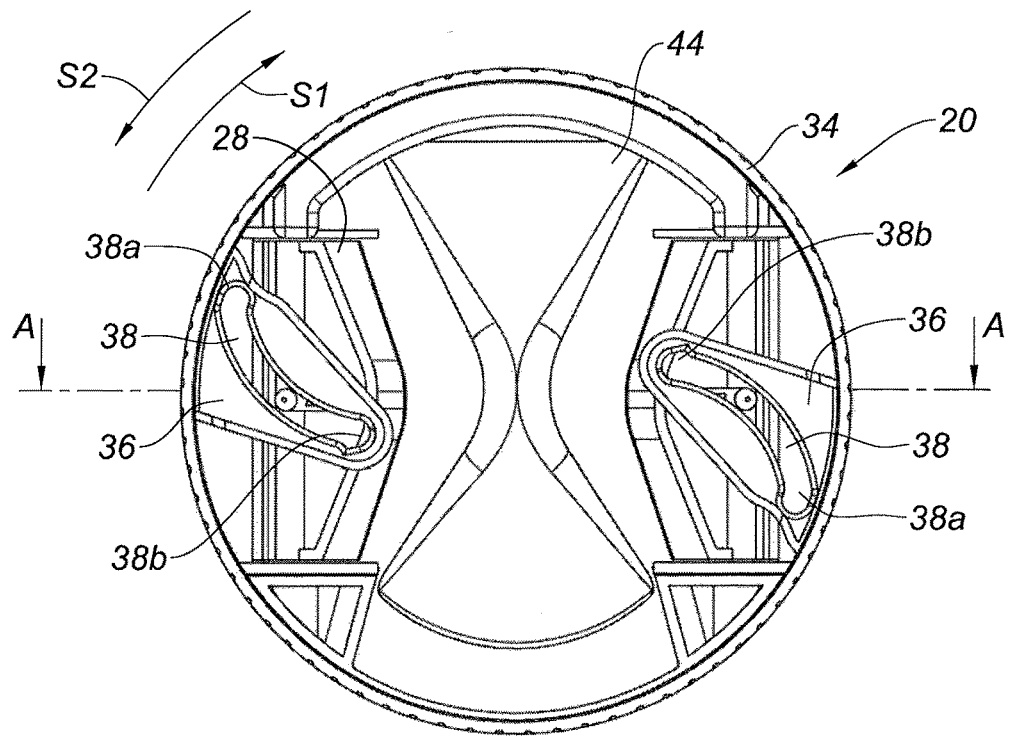
FIG. 5 is a top view of the device in FIG. 2 in which flaps are in an intermediate position.
Figure 6:
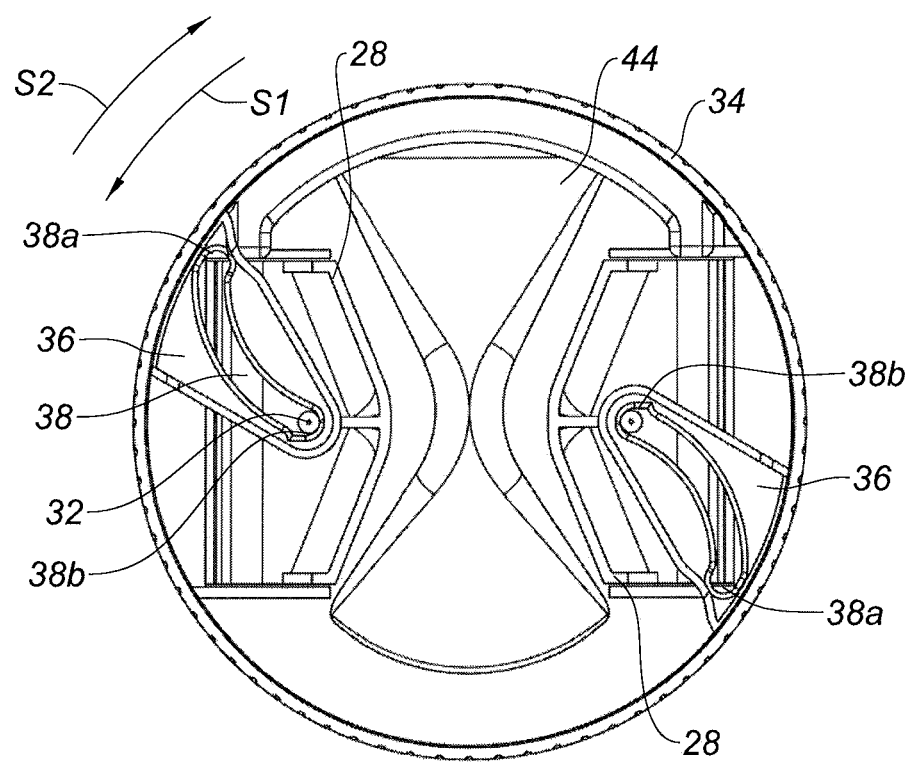
FIG. 6 is a top view of the device in FIG. 2 in which the flaps are in a close-together position.
Figure 7:
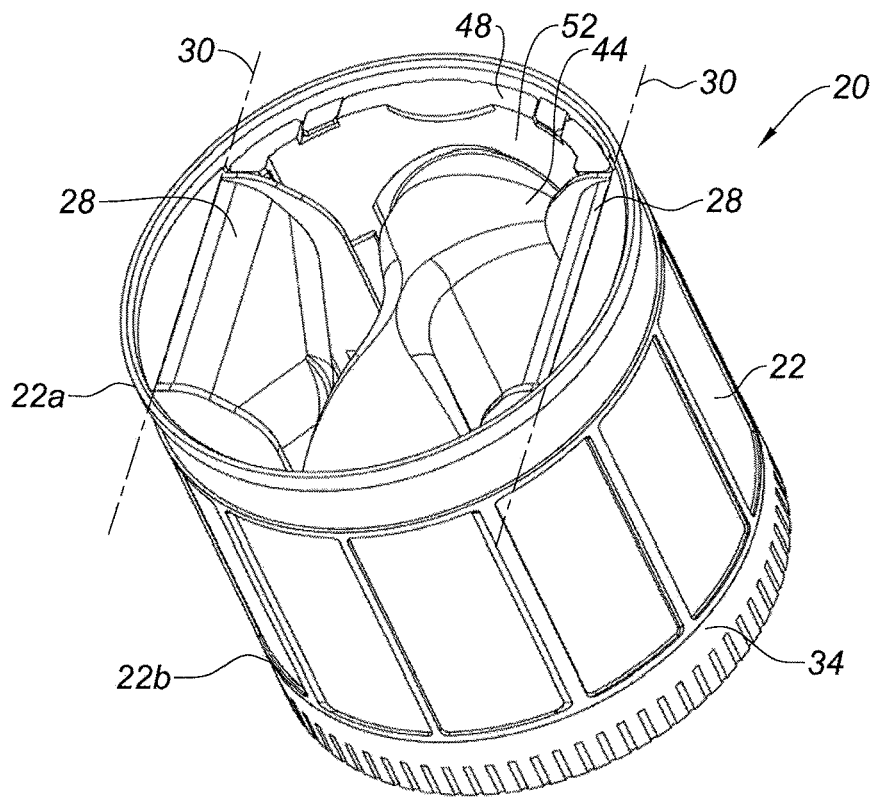
FIG. 7 is a three-quarter rear view of the device in FIG. 2.
Figure 8:
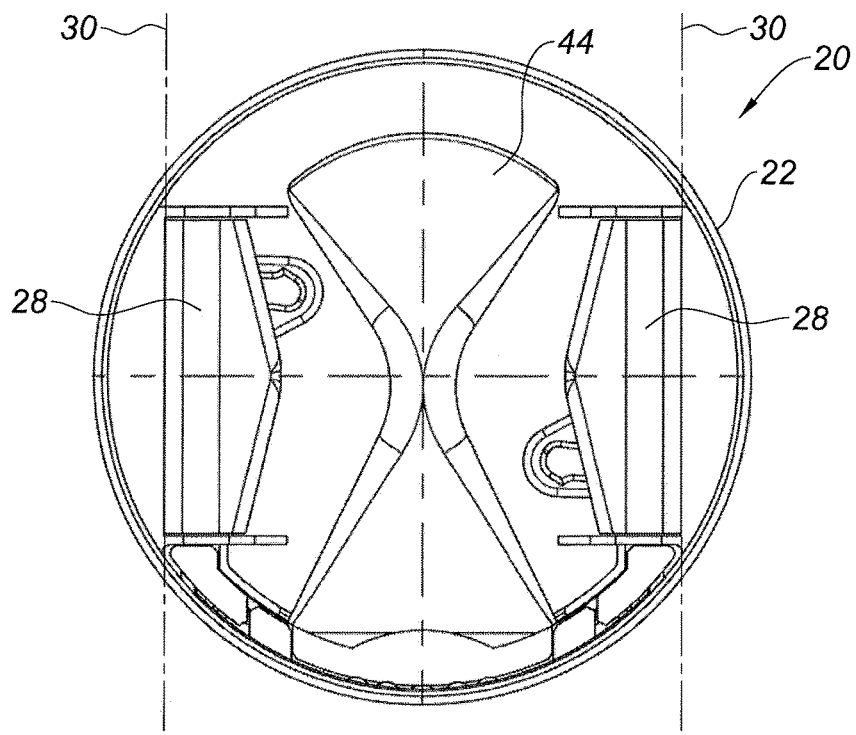
FIG. 8 is a bottom view of the device in FIG. 2.

The device 20 comprises two flaps 28 extending inside the body 2 and adapted to pivot about axes 30, so as to occupy:

a spaced-apart position (shown in FIG. 4);

an intermediate position (shown in FIG. 5); and a close-together position (shown in FIG. 6).

The flaps 28 are molded to the body 22 and have thinning of material (shown in FIG. 9) defining the axes 30. These axes 30 extend at the upstream end portion 22a of the body 22 and are transverse to the axis 24.

The flaps 28 are provided with fingers 32 forming male drive means. The fingers 32 are disposed at the downstream end portion 22b.

The device 20 comprises a ring 34 pivotally mounted on the downstream end portion 22b of the body 22 about the axis 24.

The ring 34 has an outer diameter substantially equal to the outer diameter of the body 22 and an inner diameter substantially equal to the inner diameter of the body 22. The ring 34 has a splined outer side.

The ring 34 is provided with tabs 36 in which C-shaped slots 38 forming female drive means are formed.

The tabs 36 extend at the downstream end portion 22a, in a plane transverse to the axis 24.

The openings 38 are adapted to receive the fingers 32. More specifically, the openings 38 have a width slightly greater than the width of the fingers 32. Thus, the sliding of the fingers 32 in the openings 38, when the flaps 28 pivot about the axes 30, is made possible.

The openings 38 have two end portions 38a and 38b (shown in FIGS. 4 to 6) shaped to receive, and immobilize, the fingers 32.

Figure 9:
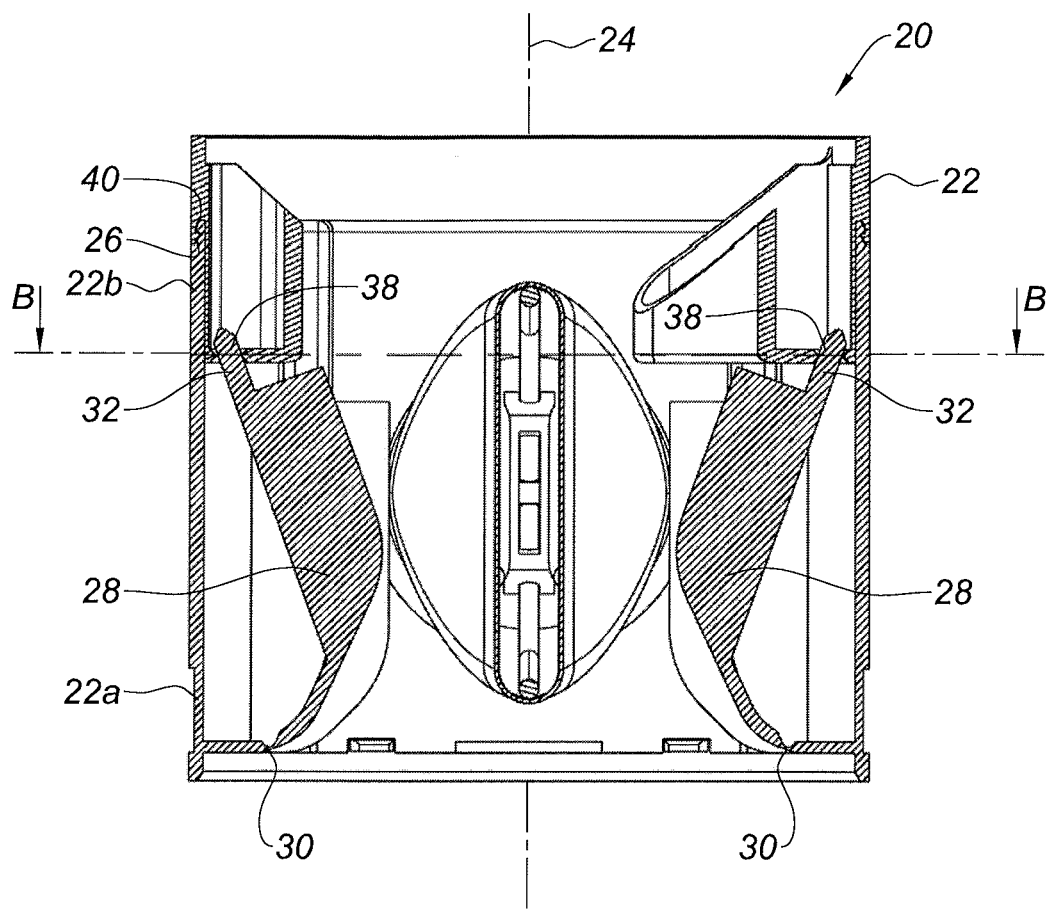
FIG. 9 is a longitudinal section along the line A-A of the device in FIG. 2.
Figure 10:
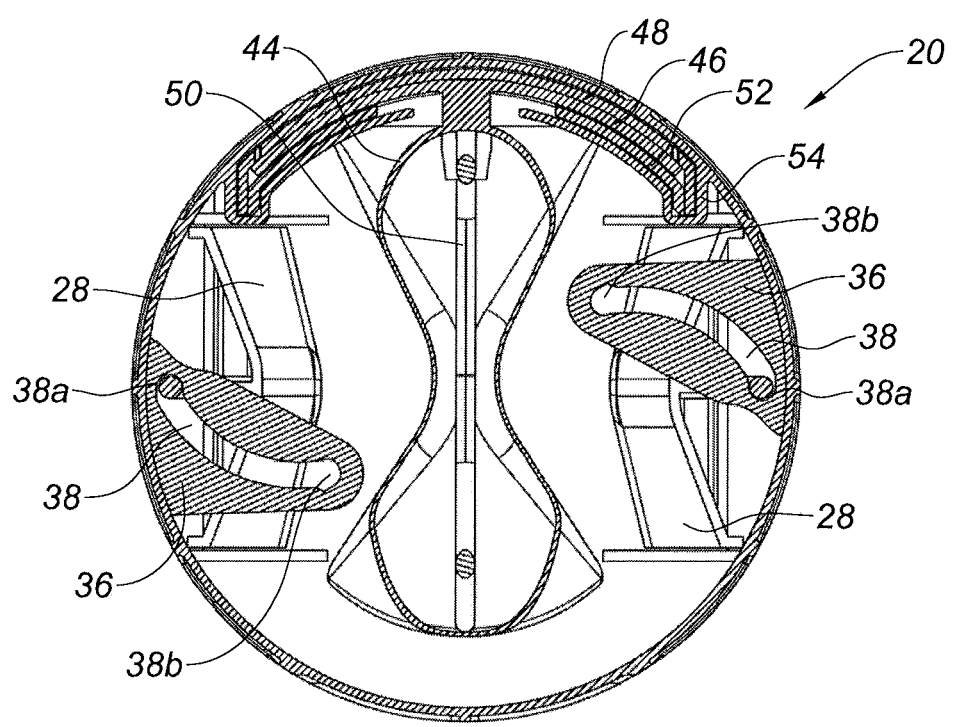
FIG. 10 is a cross section along the line B-B of the device in FIG. 2.

The ring 34 is provided with a female snap-fastening member 40 (shown in FIG. 9). The female snap-fastening member 40 takes herein the form of an annular groove.

The male 26 and female 40 snap-fastening members are designed to prevent the axial translation of the ring 34 on the body 22, and allow the ring 34 to pivot on the body 22.

The device 20 finally comprises a regulating member 42 adapted to regulate the flow rate of air flowing in the body 22 around a set point.

Figure 11:
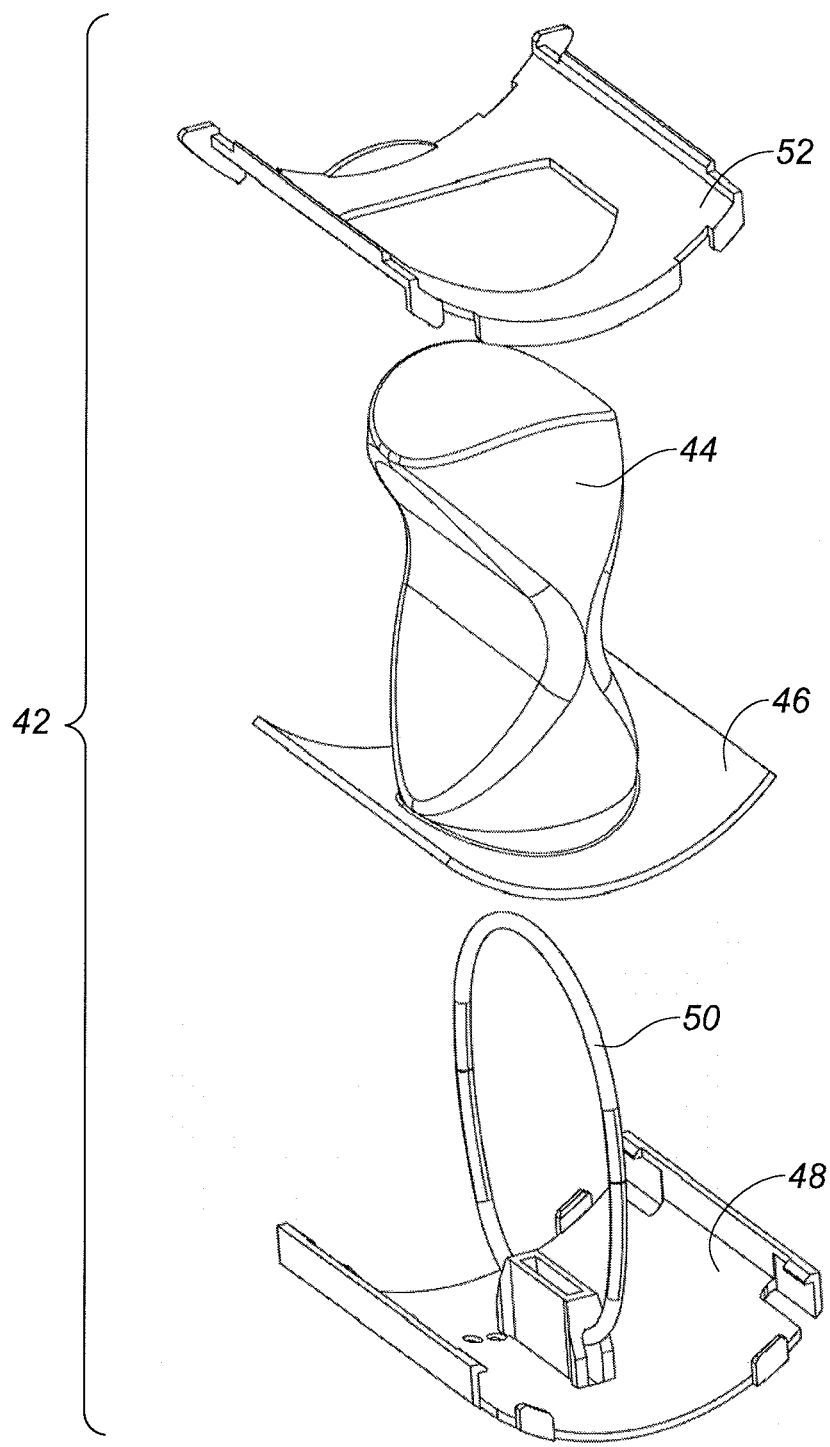
FIG. 11 is an exploded perspective view of an air flow rate regulating member of the device in FIG. 2.

The regulating member 42 (shown in FIG. 11) comprises a flexible chamber 44 arranged to inflate, or deflate, according to the pressure difference between the upstream 22a and downstream 22b end portions of the body 22. The flexible chamber 44 is mounted on a base 46.

The regulating member 42 comprises a support 48 on which a reinforcement 50 engaged inside the flexible chamber 44 is fixed.

The regulating member 42 finally comprises a cover 52 having an opening 54 inside which the flexible chamber 44 is engaged.

The cover 52 and the support 48 enclose the base 46. The cover 52, the support 48 and the base 46 are engaged in a housing 54 (shown in FIG. 10) arranged inside the body 22, in such a way that the flexible chamber 44 radially extends inside the body 22 between the flaps 28.

A method of using the device 20 is now described with reference to FIGS. 4 to 6.

Initially, the ring 34 is mounted on the body 22 (as shown in FIG. 4). The fingers 32 are received and immobilized by the end portions 38a of the slots 38. The flaps 28 are in a spaced-apart position.

When an installer wishes to reduce the air passage cross section, and consequently, the flow rate of air flowing in the air duct, he drives the ring 34 in rotation about the axis 24 in a direction S1.

The fingers 32 are then released from the end portions 38a and slide inside the slots 38 until they are received and immobilized by the end portions 38b. The flaps 28 pivot about the axes 30 so as to successively occupy their intermediate position (shown in FIG. 5) and then their close-together position (shown in FIG. 6).

When the installer wishes to increase the air passage cross section, and consequently the flow rate of air flowing in the air duct, he drives the ring 34 in rotation about the axis 24 in a direction S2 opposite to the direction S1.

The fingers 32 are then released from the end portions 38b and slide inside the slots 38 until they are received and immobilized by the end portions 38b. The flaps 28 pivot about the axes 30 so as to successively occupy their intermediate position (shown in FIG. 5) and then their close-together position (shown in FIG. 6).

It goes without saying that the invention is not limited to the only embodiment of the device described above by way of example, but on the contrary, it encompasses all the alternative embodiments thereof.

In an alternative embodiment, conversely to what has been described, the ring may be provided with a male drive member and each flap may be provided with a female drive member. These male and female drive means are arranged in such a way that, in response to a pivoting of the ring on the body, the male drive means cooperates with the female drive means to alter the position of each flap, and, as a consequence, the air passage cross section.

In another alternative embodiment, the ring and the body have complementary indexing means adapted to receive, and immobilize, the ring in three predetermined positions relative to the body, corresponding to the spaced-apart, intermediate and close-together positions of the flaps.

For example, the indexing means comprise a plurality of notches formed on an inner side of the ring. These notches are arranged to cooperate with at least one boss formed on the body.

The invention claimed is:

1. A device for adjusting a flow rate of air flowing in an air duct, comprising:
   a tubular body extending along an axis fluidly connected to the air duct;
   at least one flap extending inside the body and adapted to pivot about an axis transverse to the axis of the body, to occupy a plurality of positions corresponding to a plurality of air passage cross sections;
   a ring pivotally mounted on an end portion of the body about the axis of this body;
   each flap being provided with a male drive means, and the ring being provided with a female drive means, or vice versa,
   the male drive means and the female drive means being arranged in such a way that, in response to a pivoting of the ring on the body, the male drive means cooperates with the female drive means to alter the position of each flap and, as a consequence, the air passage cross section.

2. The device according to claim 1, wherein each flap is provided with the male drive means, and the ring (34) is provided with the female drive means.

3. The device according to claim 1, wherein the pivot axis of each flap extends at an upstream end portion of the body, in the air flow direction, and the male and female drive means are disposed at a downstream end portion.

4. The device according to claim 1, wherein the male drive means comprises a finger, the female drive means comprises a tab extending in a plane transverse to the axis of the body and wherein a C-shaped slot adapted to receive the finger is provided.

5. The device according to claim 4, wherein the slot has two end portions shaped to receive, and immobilize, the finger.

6. The device according to claim 1, wherein each flap is molded to the body, and in that each flap has a thinning of material defining the pivot axis of this flap.

7. The device according to claim 1, wherein the body is provided with a male snap-fastening member and the ring is provided with a female snap-fastening member, or vice versa, the male and female snap-fastening members being designed to prevent axial translation of the ring on the body and allow the ring to pivot on the body.

8. The device according to claim 1, wherein the ring and the body have complementary indexing means, such as bosses and notches, adapted to receive, and immobilize, the ring in at least one predetermined position relative to the body.

9. The device according to claim 1, wherein the ring has a splined outer side.

10. The device according to claim 1, wherein the ring has an outer diameter substantially equal to the outer diameter of the body, and preferably an inner diameter substantially equal to the inner diameter of the body.

11. The device according to claim 1, further comprising a flexible chamber arranged to inflate, or deflate, according to the pressure difference between the upstream and downstream end portions of the body.

* * * * *